US006834222B2

(12) United States Patent
Lu et al.

(10) Patent No.: US 6,834,222 B2
(45) Date of Patent: Dec. 21, 2004

(54) TIRE IMBALANCE DETECTION SYSTEM AND METHOD USING ANTI-LOCK BRAKE WHEEL SPEED SENSORS

(75) Inventors: Jianbo Lu, Livonia, MI (US); Douglas Scott Rhode, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/375,653

(22) Filed: Feb. 27, 2003

(65) Prior Publication Data

US 2004/0172181 A1 Sep. 2, 2004

(51) Int. Cl.⁷ .............................. G06F 7/00
(52) U.S. Cl. ........................ 701/36; 710/37
(58) Field of Search .................... 701/36, 37

(56) References Cited

U.S. PATENT DOCUMENTS

| 3,675,495 A | * | 7/1972 | MacMillan ............... 73/466 |
| 3,824,861 A | | 7/1974 | Goebel |
| 3,953,074 A | * | 4/1976 | Cox ..................... 301/5.22 |
| 4,046,017 A | | 9/1977 | Hill |
| 4,372,598 A | | 2/1983 | Quelch |
| 4,907,452 A | | 3/1990 | Yopp |
| 5,269,186 A | | 12/1993 | Yopp |
| 5,469,741 A | | 11/1995 | Scourtes et al. |
| 5,641,904 A | | 6/1997 | Kopp et al. |
| 5,800,331 A | | 9/1998 | Song |
| 6,161,431 A | | 12/2000 | Drahne et al. |
| 6,278,361 B1 | | 8/2001 | Magiawala et al. |
| 6,313,742 B1 | | 11/2001 | Larson |
| 6,314,342 B1 | | 11/2001 | Kramer et al. |

* cited by examiner

Primary Examiner—Yonel Beaulieu

(57) ABSTRACT

A system and method for developing signals to activate vehicle stability controllers wherein wheel speed sensors for the wheels of the vehicle are used as input variables. The wheel speed values are used in a wheel rolling radius determination. Dynamic imbalance strength estimation and dynamic imbalance strength magnitude use the computed wheel rolling radius information in a tire imbalance logic unit to develop signals to activate the vehicle stability controllers.

13 Claims, 5 Drawing Sheets

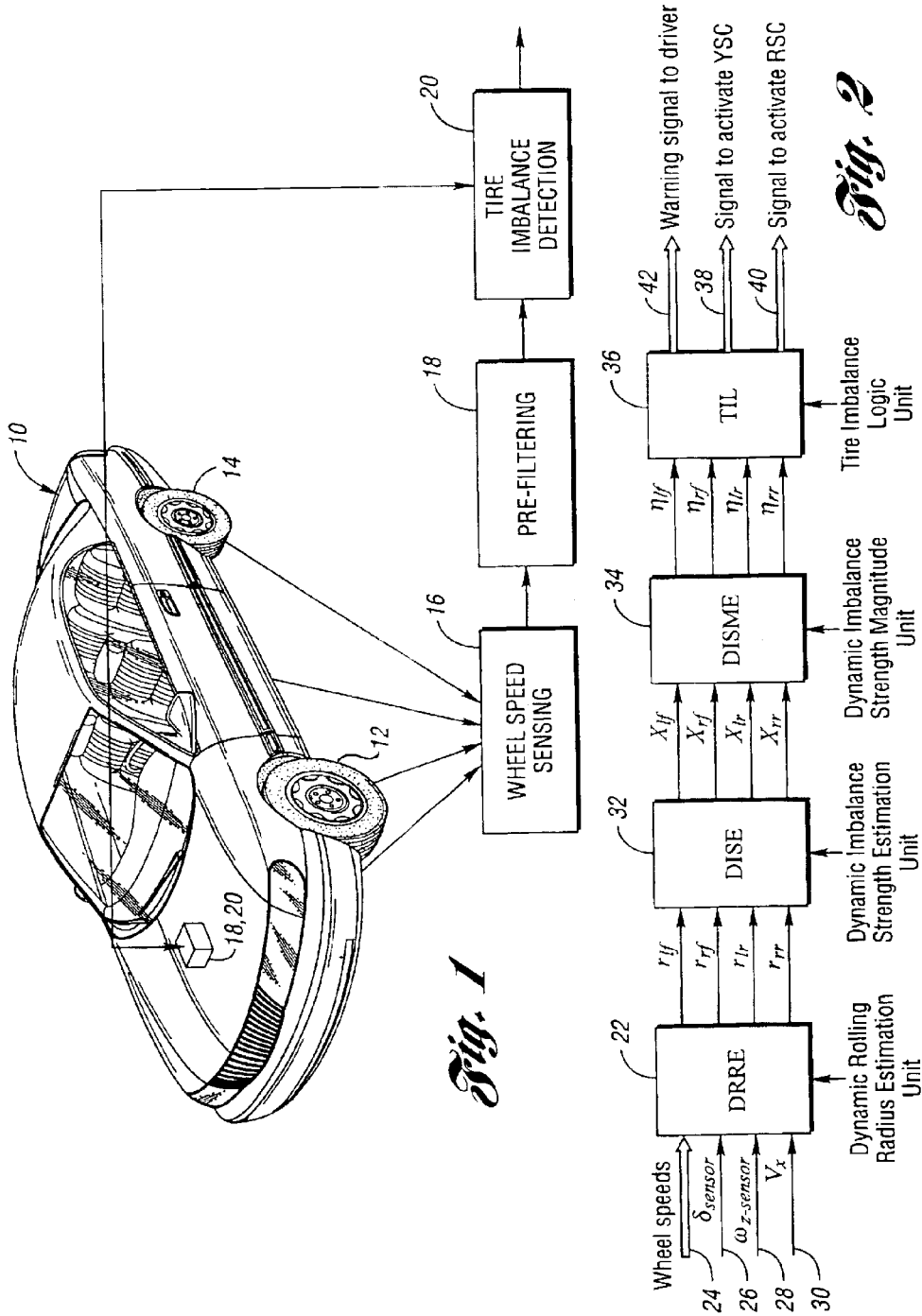

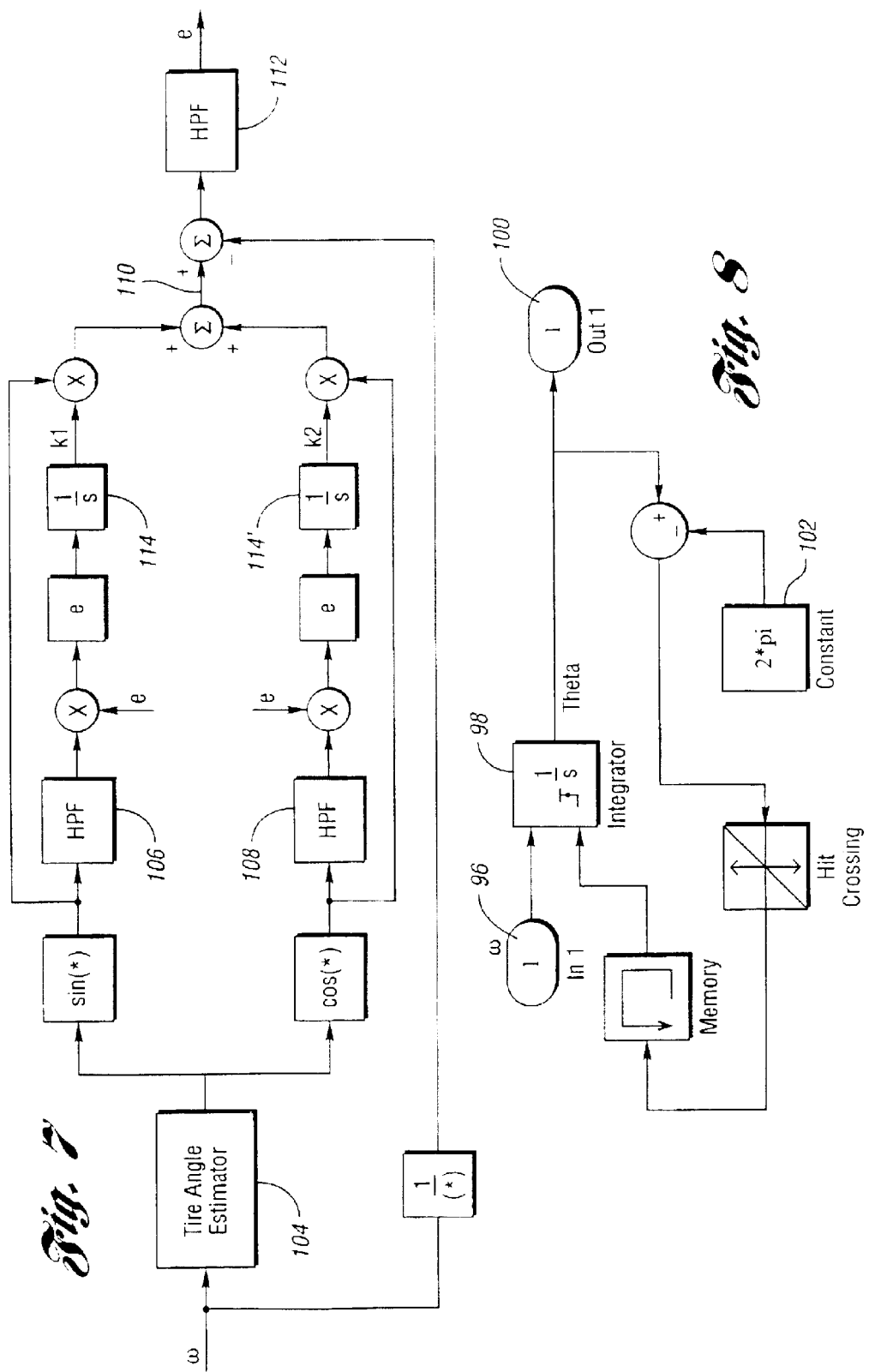

TIRE IMBALANCE DETECTION SYSTEM AND METHOD USING ANTI-LOCK BRAKE WHEEL SPEED SENSORS

BACKGROUND OF THE INVENTION

1. Field of the Invention

A system and method for detecting and monitoring tire and wheel imbalance for a wheeled vehicle.

2. Background Art

It is recognized in prior art teachings that dynamic behavior of a vehicle depends upon traction characteristics of the wheels and tires. Fluctuations in forces normal to the road surface at the tire road interface for each of the wheels will affect the traction characteristics of the tire. Known vehicle control systems for controlling vehicle yaw and roll characteristics may use wheel imbalance information to compensate for the adverse effects of wheel imbalance on the stability of the vehicle.

Sudden wheel imbalance may indicate, for example, tire effects such as loss of air pressure or tread loss. An improvement in vehicle dynamics made possible by detecting wheel imbalance, furthermore, may help avoid excessive tire wear and deterioration of vehicle wheel suspensions.

Although tire imbalance can be detected using spindle-mounted accelerometers or force transducers, Systems that use such imbalance detection techniques, of necessity, are relatively complex and costly.

Known methods for detecting out-of-roundness of tires, under-inflated tires, defective front-end alignment or off-center loads on the vehicle wheels are disclosed, for example, in U.S. Pat. No. 6,313,742. Instantaneous angular velocity of the wheels for each wheel of a vehicle is computed using anti-lock brake system data in the system of the '742 patent and compared to an instantaneous computation of vehicle speed. Tire radius and tolerance data for the road wheels are used to compute rotational velocity of the wheels as a function of vehicle speed and tire radius data. The estimated velocity is compared to the computed rotational velocity to determine whether updated tolerances are respected. A pressurization error is computed if one wheel is characterized by tolerances that are outside a predetermined range.

An example of a monitoring system for measuring imbalance of vehicle tires using acceleration signals from an acceleration sensor for the wheels is described in U.S. Pat. No. 6,278,361.

SUMMARY OF THE INVENTION

The invention comprises a method for monitoring tire imbalance that does not require the use of accelerometers or force transducers. It instead uses wheel speed sensors that readily are available on vehicles equipped with automatic braking systems. This feature makes it possible to reduce the complexity of imbalance detection since hardware normally available with vehicles having automatic braking systems to improve wheel braking can be used for the additional purpose of providing control system input data to detect and monitor wheel imbalance.

The invention comprises a method for monitoring and measuring wheel speeds for vehicle road wheels and for computing an instantaneous dynamic rolling radius of each wheel using wheel speed data, vehicle speed, steering angle and yaw rate. A dynamic imbalance strength estimation then is computed using the rolling radius information. Based on the dynamic imbalance strength estimate for each wheel, the dynamic imbalance strength magnitude is computed. A tire imbalance logic then may be used, for example, to develop signals to activate a vehicle stability controller and to notify the driver of a wheel imbalance.

BRIEF DESCRIPTION OF THE DRAWINGS

FIG. 1 is a schematic block diagram of a tire imbalance detection system for a road vehicle;

FIG. 2 is a schematic block diagram for the tire imbalance detection system of the invention;

FIG. 7 is a schematic diagram of a single frequency adaptive filter block;

FIG. 8 is a schematic diagram of a tire angle estimator used in the filter block diagram of FIG. 7;

DETAILED DESCRIPTION OF THE PREFERRED EMBODIMENT(S)

Figure 3:
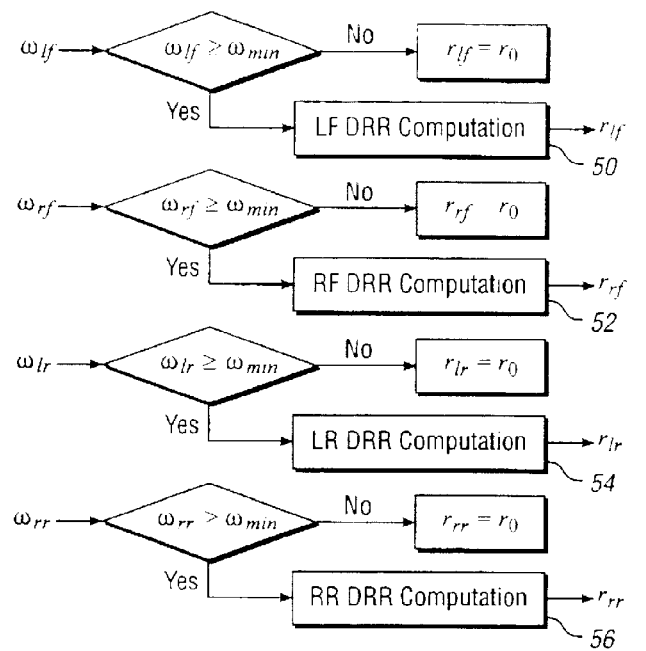
FIG. 3 is a diagram of software steps for determining a tire dynamic rolling radius estimation.

The present disclosure describes two embodiments of the invention for detecting wheel imbalance for a motor vehicle as road wheels move over a road surface. Both embodiments use data that readily is available from wheel speed sensors for a moving vehicle equipped with yaw and roll stability controls.

In accordance with the first embodiment, the vehicle stability control system reacts readily to tire imbalance using signals developed from measured wheel speed data.

In FIG. 1, an automotive vehicle 10 has steerable front wheels 12 and rear traction wheels 14. Each wheel includes a wheel speed sensor for measuring instantaneous wheel speed data for control block 16. The wheel speed data is filtered in filter control block 18 and distributed to a tire imbalance detection unit shown as control block 20. The function of control block 20 is schematically illustrated in FIG. 2.

A dynamic rolling radius estimation unit in FIG. 2, shown at 22, receives wheel speed input data from the wheel speed sensors, as shown at 24. Steering angle for the steerable wheels 12 is determined and is distributed to the dynamic rolling radius estimation unit 22, as shown at 26. Other input data for the unit 22 include a yaw angle sensor input signal 28 and a vehicle longitudinal velocity input signal $V_x$ at 30. The value of the velocity signal $V_x$ is calculated using measured wheel speed data in an automatic braking system. The data received by the unit 22 is used by the control system to detect each tire's dynamic rolling radius.

A dynamic imbalance strength estimation unit 32 calculates the product of the distance between the imbalance and the center of the wheel. It develops a sinusoidal function of wheel rotational speed.

A dynamic imbalance strength magnitude unit 34 receives the imbalance factors for each of the four wheels ($X_{lf}$, $X_{rf}$, $X_{lr}$, and $X_{rr}$) and develops corresponding imbalance strength magnitude factors ($\eta_{lf}$, $\eta_{rf}$, $\eta_{lr}$ and $\eta_{rr}$, as indicated in FIG. 2). The tire imbalance logic unit 36 receives the dynamic imbalance strength magnitude input data and develops signals at 38 and 40 to activate, respectively, the yaw and roll control systems, as shown at 38 and 40. A warning signal for the driver may also be developed to alert the driver that the tires are imbalanced. This is indicated at 42.

In FIG. 2, the wheel speed signals in the automatic brake system module can be used to calculate the vehicle longitudinal VX velocity. The yaw angular rate sensor signal az-sensor is available without the requirement for additional hardware, and the steering angle sensor $\delta_{sensor}$ can readily be measured using the steering gear linkage. The measured wheel speeds are designated as $\omega_{lf\text{-}sensor}$, $\omega_{rf\text{-}sensor}$, $\omega_{lr\text{-}sensor}$ and $\omega_{rr\text{-}sensor}$ for the left front, right front, left rear and right rear wheels, respectively.

The output of the dynamic rolling radius estimation unit are the radius values $r_{lf}$, $r_{rf}$, $r_{lr}$ and $r_{rr}$. These values can be calculated from the measured signals as follows:

$$r_{lf} = \frac{V_x \cos(\delta_{sensor}) + \omega_{t\text{-}sensor}[l_f \sin(\delta_{sensor}) - t_f \cos(\delta_{sensor})]}{\omega_{rf\text{-}sensor}} \quad (1)$$

$$r_{rf} = \frac{V_x \cos(\delta_{sensor}) + \omega_{t\text{-}sensor}[l_f \sin(\delta_{sensor}) + t_f \cos(\delta_{sensor})]}{\omega_{rf\text{-}sensor}}$$

$$r_{lr} = \frac{V_x - \omega_{t\text{-}sensor} l_r}{\omega_{lr\text{-}sensor}}$$

$$r_{rr} = \frac{V_x + \omega_{t\text{-}sensor} l_r}{\omega_{rr\text{-}sensor}}$$

In the foregoing equations, values $t_f$ and $t_r$ are the distances between the centerline of the vehicle and the tires at the front and rear (also called half-track distances). The terms $l_f$ and $l_r$ are the distances between the center of gravity of the vehicle and the front and rear axles, respectively. $\delta$ is the front wheel steering angle and $V_x$ is the vehicle longitudinal velocity.

Figure 5:
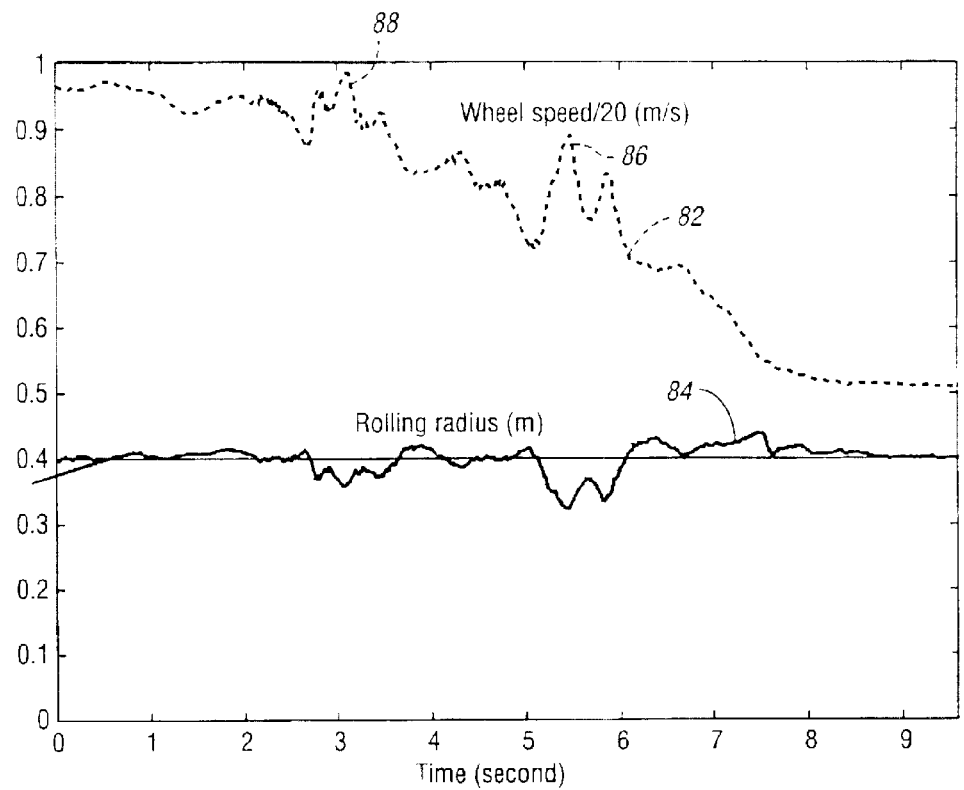
FIG. 5 is an example of time plots of computed rolling radius for a road wheel and corresponding wheel speed using the computations of the present invention.

FIG. 5 is a plot of the actual data showing variations of the rolling radius for a tire over time, as well as the wheel speed variations over time. The data in FIG. 5 is calculated using the equations (1) shown above.

The wheel rolling radius for the wheel i (where i=lf, rf, lr, and rr, indicating the left-front, right-front, left-rear and right-rear wheels, respectively) satisfies the following force balancing equation for forces in the vertical direction of the wheel using Newton's law when the wheel rotational speed sensor is almost constant:

$$M\ddot{r}_i = -C_t \dot{r}_i - K_t(r_i - r_{i0}) - M\eta_i \omega_{i\text{-}sensor}^2 \sin(\omega_{i\text{-}sensor} t + \theta_0) \quad (2)$$

In equation (2), the value for $\theta_0$ is the angular position of the imbalance with respect to the vertical direction. If the rotational speed of the wheels is fast, equation (2) can be modified as follows:

$$M\ddot{r}_i = -C_t \dot{r}_i - K_t(r_i - r_{i0}) - M\eta_i \omega_{i\text{-}sensor}^2 \sin\left(\int_0^t \omega_{i\text{-}sensor} dt + \theta_0\right), \quad (3)$$

where M is the mass of the wheel, $C_t$ is the tire damping rate in the vertical direction, $K_t$ is the tire spring rate in the vertical direction, and $\eta_i$ is a quantity indicative of the strength of the tire imbalance. The tire imbalance can be calculated as follows:

$$\eta_i = \frac{M_\Delta}{M} K_i,$$

where the imbalanced mass is an extra mass $M_\Delta$ (see FIG. 6) added to the tire mass, so that the total tire mass is $M+M_\Delta$.

If the imbalance is due to total mass redistribution, as in the case of tire tread separation, there is no $M_\Delta$. Therefore, $\eta_i = K_i$, where $K_i$ is the distance between the center of mass of the road wheel in question and the rotation center of the road wheel. $\omega_{i\text{-}sensor}$ is the rotational speed of that wheel, where i can be the left-front wheel, the right-front wheel, the left-rear wheel or the right-rear wheel. The initial angular position of the imbalance with respect to the vertical direction is expressed as $\theta_{i0}$. The term $r_i$ is the dynamic rolling radius and $r_{i0}$ is the initial or the average rolling radius of the wheel in question when there is no imbalance in the tire and wheel assembly.

Since the detection is not finished in one rotation of the tire, the influence of the initial angular position of the imbalance with respect to the vertical direction can be neglected. Therefore, it can be assumed that the value for $\theta_{i0}$ is zero and equations (2) and (3) set forth above can be simplified, respectively, to the following:

$$M\ddot{r}_i = C_t \dot{r}_i - K_t(r_i - r_{i0}) - M\eta_i \omega_{i\text{-}sensor}^2 \sin(\omega_{i\text{-}sensor} t)$$

$$M\ddot{r}_i = -C_t \dot{r}_i - K_t(r_i - r_{i0}) - M\eta_i \omega_{i\text{-}sensor}^2 \sin\left(\int_0^t \omega_{i\text{-}sensor} d\tau\right) \quad (5)$$

From equation (5), the imbalance strength $\eta_i$ can be obtained as follows:

$$\eta_i \sin(\omega_{i\text{-}sensor} t) = \frac{M\ddot{r}_i + C_t \dot{r}_i + K_t(r_i - r_{i0})}{M\omega_{i\text{-}sensor}} \text{ or} \quad (6)$$

$$\eta_i \sin\left(\int_0^t \omega_{i\text{-}sensor} d\tau\right) = \frac{M\ddot{r}_i + C_t \dot{r}_i + K_t(r_i - r_{i0})}{M\omega_{i\text{-}sensor}} \quad (7)$$

The i-th tire dynamic imbalance factor is defined as:

$$\chi_i = \frac{M\ddot{r}_i + C_t \dot{r}_i + K_t(r_i - r_{i0})}{M\omega_{i\text{-}sensor}} \quad (8)$$

for i=lf, rf, lr, rr, indicating the left-front, right-front, left-rear and right-rear wheels, respectively. Then $X_i$ can be used to estimate imbalance strength $\eta_i$.

Figure 9:
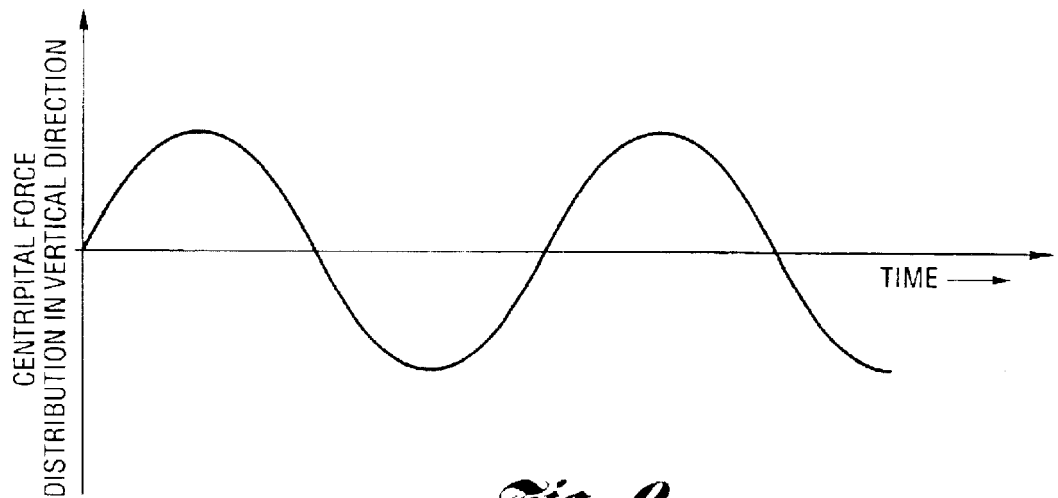
FIG. 9 is a sine wave plot of centripetal force distribution in the vertical direction for a vehicle road wheel using the imbalance detection technique of the invention.

Equations (6) and (7) define a sine wave as indicated in FIG. 9.

In order to achieve a stable numerical plot in FIG. 9, the differentiation used in computing the first and second derivatives of $r_i$ from the estimated dynamic rolling radius $r_i$ is conducted through a second order filter with a proper cutoff frequency. This filter has the following z-domain transfer function:

$$T_{DIFF}(z) = \frac{n(1 - z^{-2})}{1 - d_1 z^{-1} + d_2 z^{-2}}. \quad (9)$$

Figure 10:
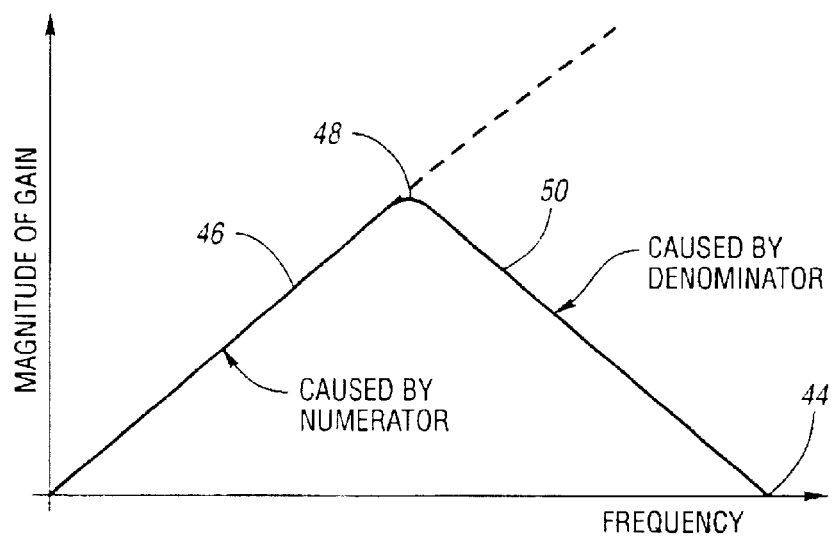
FIG. 10 is a transfer function plot of a second order filter used to calculate the derivatives of wheel radius used in calculating imbalance.

The transfer function defined by equation (9) is illustrated graphically in FIG. 10. The slope of the plot in FIG. 10 shown at 46 is the value created by the numerator of equation (9). At point 48, the slope of the plot turns negative, as shown at 50. The transfer function becomes zero at 44.

This relationship is caused by the denominator of equation (9).

The signals developed by the dynamic imbalance strength estimation unit 32 and distributed to the dynamic imbalance strength magnitude unit 34 can be noisy, even if the differentiation filter in equation (9) is used to replace the pure differentiation equation. Useful information can be extracted from a noisy $X_i$ factor by using a second order low pass filter. The cutoff frequency for this filter, shown at 44 in FIG. 10, is carefully chosen so that the values for $X_i$ developed by the dynamic imbalance strength estimation unit 32 will keep the frequency relatively constant due to the imbalance, the imbalance being proportional to the wheel speeds. The cutoff frequency must exceed the maximum wheel speeds (or the maximum wheel speed in which the tire imbalance detection must be valid). For example, a vehicle with maximum travel velocity of 200 mph and a nominal rolling radius for the wheel of 0.4 meters, the cutoff frequency must be greater than 35 Hz. The cutoff frequency can be calculated as follows:

$$\varpi_{cut\text{-}off} \geq \frac{V_{xmax}}{14.1372 r_0}, \tag{10}$$

where $V_{xmax}$ is the maximum vehicle travel velocity limit in mph, and $r_0$ is the nominal rolling radius of the tire. The second order filter with a cutoff frequency satisfying equation (1) can be expressed by the following z-domain function:

$$T_{LPF}(z) = \frac{a_0(1 + 2z^{-1} + z^{-2})}{1 - b_1 z^{-1} + b_0 z^{-2}} \tag{11}$$

A digital version of the filtered $X_i$ can be obtained from the following iterative algorithm:

$$\chi_{iF}(k) = b_1 \chi_{iF}(k31\ 1)31\ b_0 \omega_{iF}(k-2) + a_0[\chi_i(k) + 2\chi_i(k-1) + \chi_i(k-2)] \tag{12}$$

where k is the number of the samples in progression.

The dynamic imbalance strength magnitude unit 34 computes the imbalance strength $\eta_i$, which is slow time varying. The differentiation of equation (7) with respect to time "t" then leads to the following equation:

$$\eta_i \cos\left(\int_0^t \omega_{i\text{-}sensor} d\tau\right) \omega_{i\text{-}sensor} = \frac{d}{dt} \chi_i \tag{13}$$

Based on equations (7) and (13), an exact formula for computing the imbalance strength $\eta_i$, can be obtained as:

$$\eta_i = \sqrt{\left[\frac{1}{\omega_{i\text{-}sensor}} \frac{d\chi_i}{dt}\right]^2 + \chi_i^2} \tag{14}$$

These equations are true when dealing with ideal sensor signals. The actual sensor signals, however, usually will have many noise components, and the computations must all be conducted in a digital environment. Therefore, various filters are needed. The first uses the filtered value $X_{iF}$ to replace $X_i$ in equation (14), and uses the differentiation filter in equation (11) to replace pure differentiation, as in the following equation:

$$\dot{\chi}_{iF}(k) = d_1 \dot{\chi}_{iF}(k-1) - d_0 \dot{\chi}_{iF}(k-2) + n[\chi_i F(k) - \chi_{iF}(k-2)] \tag{15}$$

Then the calculated imbalance strength $\eta_i$ can be expressed as follows:

$$\hat{\eta}_i(t) = \sqrt{\left[\frac{1}{\omega_{i\text{-}sensor}(t)} \dot{\chi}_{iF}(t)\right]^2 + \chi_{iF}(t)^2} \tag{16}$$

A further filtering of the computed balance strength $\hat{\eta}_i$ is used to extract smooth $\hat{\eta}_I$ characterization as follows:

$$\eta_{iF}(k) = c \eta_{iF}(k-1) + (1-c) \hat{\eta}_i(k-1) \tag{17}$$

where c is a positive number less than 1, which reflects the cutoff frequency of the low pass filter.

The imbalance strength $\eta_i$ calculated by the dynamic imbalance strength magnitude unit 34 is distributed to the tire imbalance logic unit 36, which processes these values and determines what actions should be taken. Depending upon the vehicle content and the severity of the imbalance, the following actions may be taken:

Issue a warning to the driver using a lamp or message center;

Send a signal to the automatic brake system to decrease the activation thresholds;

Send a signal to the powertrain control module to speed limit the vehicle; and

Send a signal at 42 to inform service providers.

FIG. 3 is a flowchart representation of the computations for the rolling radius estimation carried out by the dynamic rolling radius estimation unit 22. The wheel speeds $\omega_{lf}$, $\omega_{rf}$, $\omega_{lr}$ and $\omega_{rr}$ are used in the computation to develop the rolling radii $r_{lf}$, $r_{rf}$, $r_{lr}$ and $r_{rr}$. A separate computation for each of the wheels occurs at 50, 52, 54 and 56 for the respective wheel speeds if the wheel speed is greater than a minimum value. If the wheel speed is less than the minimum wheel speed for each of the wheels, the rolling radius for the respective wheel is equal to the initial or the average rolling radius of that wheel when there is no imbalance, as indicated in FIG. 3.

Figure 4:
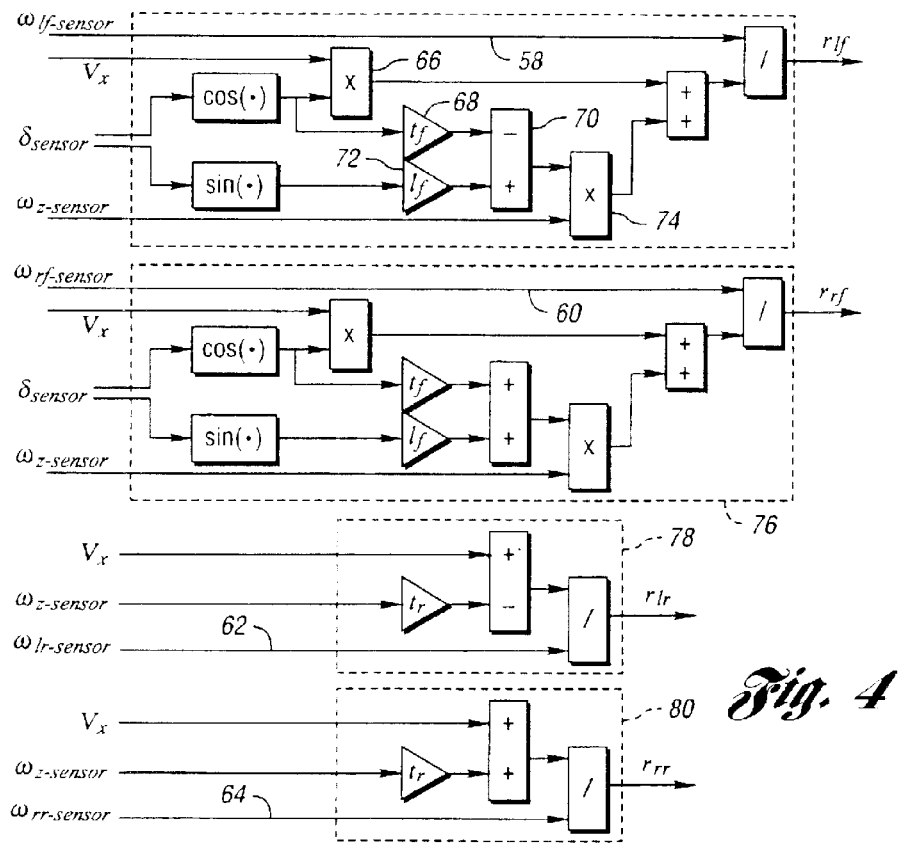
FIG. 4 is a block diagram of the software logic steps in the computation of the dynamic rolling radius estimation for the road wheels.

The computations carried out in the computation blocks of FIG. 3 are defined by the four equations (1) above. The logic diagram of the computations appears in FIG. 4. The software denominator for each of the equations (1) is the value $\omega_{i\text{-}sensor}$. Speed sensor data $\omega_{lf\text{-}sensor}$ or $\omega_{rf\text{-}sensor}$ or $\omega_{lr\text{-}sensor}$ or $\omega_{rr\text{-}sensor}$ is represented in FIG. 4 at 58, 60, 62 and 64, respectively, The vehicle speed is multiplied by the cosine of the value $\delta_{sensor}$, as shown at 66. The cosine of the angle 6 sensor is distributed also to multiplication step 68, which produces a product at 70 that is subtracted from the sine of the angle $\delta_{sensor}$ times the quantity $l_f$, as shown at 72. The output of the algebraic summing at 70 is multiplied at 74 by the value $\omega_{z\_sensor}$, which is added to the output for step 66, thus defining the numerator for the first equation (1). Similar computations are carried out at computation blocks 76, 78 and 80 for the rolling radii $r_{rf}$, $r_{lr}$ and $r_{rr}$, respectively.

FIG. 5 shows an example of computed dynamic rolling radii for the left-front wheel of a vehicle during a straight line driving mode with light braking. The wheel speed, measured in meters-per-second, is plotted at 82 and the rolling radii in meters is plotted at 84. A change in rolling radius, as indicated in FIG. 5, corresponds to a noticeable change in the wheel speed, as indicated by the peak values 86 and 88.

An alternate method for estimating tire imbalance now will be described.

Figure 6:
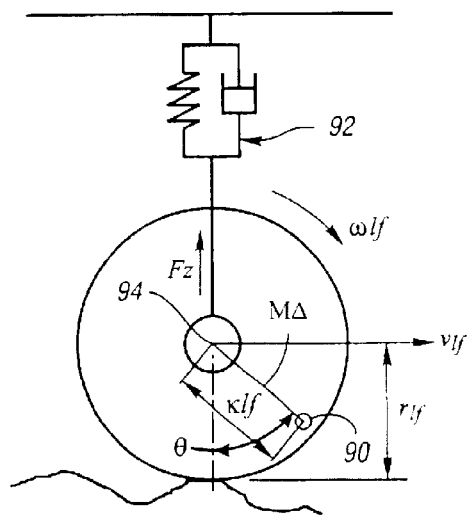
FIG. 6 is a diagram of a road wheel showing the road wheel forces and data used in an imbalance logic unit.

In FIG. 6, the imbalance is modeled as a point mass $M_A$, shown at 90. A wheel is suspended from the frame of vehicle 10 frame by a suspension damper and spring assembly 92.

The mass 90 is located a distance $k_{if}$ from the wheel center 94. Adding the centripetal force of the imbalance to the nominal vertical force $F_0$ gives the normal force $F_z$ for an imbalanced tire in accordance with the following relationship:

$$F_z = F_0 + M_\Delta \kappa_{if} \omega^2 \sin(\omega t + \theta_0) \tag{18}$$

Assume the true ground speed at the wheel is $V_x$. The rolling radius of the tire, r, relates the ground speed to the wheel speed by the equation:

$$\omega = \frac{V_x}{r}$$

Assuming r is dependent upon the normal force, then:

$$r = r_0 - K_t F_z.$$

where $r_0$ is the unloaded rolling radius of the tire and $K_t$ is a constant relating the normal force to changes in effective rolling radius. Combining the preceding three equations and solving for the wheel speed gives:

$$\omega = \frac{V}{r_0 - K_t F_z} = \frac{V}{r_0 - K_t(F_0 + M_\Delta \kappa_{if} \omega^2 \sin(\omega t + \theta_0))}$$

Inverting $\omega$, $$\frac{1}{\omega} = \frac{r_0 - K_t F_0}{V_x} + \frac{K_t M_\Delta \kappa_{if} \omega^2 \sin(\omega t + \theta_0)}{V_x}$$

The first term of the right-hand side of the equation above does not vary with the wheel position. The second term is directly correlated with the wheel position, sin (wt+θ₀). This correlation can be used to estimate $K_t M_\Delta \kappa_{if}$, an indication of wheel imbalance.

FIG. 7 shows a single frequency adaptive filter that can be used to estimate the amplitude and the phase of the imbalance sinusoid. The filter circuit of FIG. 7 includes the tire angle estimator schematically shown in FIG. 8. The wheel speed ω is sensed by the tire angle estimator 104, which integrates the speed signal to estimate the wheel position. The input is shown in FIG. 8 at 96 and the integration function is carried out at step 98. To prevent numerical overflow, the output of the estimator at 100 is limited to the value 2 π, as shown at 102. The tire angle estimator was implemented in simulation by the subsystem schematically shown in FIG. 8 and incorporated in the filter block diagram of FIG. 7 at 104.

In FIG. 7, the sine value for the estimated tire angle is delivered to the high pass filter 106. The cosine value is delivered to high pass filter 108. These filters are used to remove the low frequency components of the wheel speed signal, which are not dependent upon tire imbalance. Their outputs are summed at 110. The filters thus improve the speed estimation and the accuracy. In the simulations, the high pass filters are single pole, as shown in the following equation:

$$HPF(s) = \frac{s}{s+6} \tag{19}$$

The error signal e shown at the output 110 and 110' in FIG. 7 is calculated in accordance with the following relationship:

$$e = HPF\left\{\frac{1}{\omega} - k_1 \sin(\omega t) - k_2 \cos(\omega t)\right\}. \tag{20}$$

The terms $K_1$ and $K_2$ are adjusted to minimize the function:

$$J(k_1, k_2) = \int e^2(t, k_1, k_2) dt. \tag{21}$$

By taking the partial derivatives of the terms in equation (21), the following result is obtained:

$$\frac{\partial J}{\partial k_1} = 2 \int e \frac{\partial e}{\partial k_1} dt. \tag{22}$$

The partial derivative of e with respect to $k_1$ is:

$$\frac{\partial e}{\partial k_1} = -HPF\{\sin(\omega t)\}. \tag{23}$$

The adaptation algorithm for computing $k_1$ and $k_2$ is a gradient minimization, which implements the value for $k_1$ as follows:

$$\dot{k}_1 = -\varepsilon \frac{\partial J}{\partial k_1} = -\varepsilon e(t) HPF\{\sin(\omega t)\}. \tag{24}$$

The adaptation gain ε is used to control the speed of adaptation. This algorithm is shown graphically by the top portion of the block diagram of FIG. 7. The corresponding adaptation for the second parameter $k_2$ is indicated in the bottom half of the block diagram of FIG. 7. The magnitude of the sinusoid, which would resemble the plot of FIG. 9, is calculated by the following equation:

$$A = \sqrt{k_1^2 + k_2^2} \tag{25}$$

This sine wave occurs at 110 in FIG. 7.

By using the square of the magnitude of $k_1^2 + k_2^2$, the computation of the square root of the amplitude can be avoided.

Both embodiments of the invention use wheel speed as an input variable. In the first embodiment, wheel imbalance is detected using a frequency domain approach. A change in wheel speed due to a radius change creates a sine wave output. In the case of the alternate embodiment of the invention, the sine wave is identified from the values computed for $k_1$ and $k_2$. The phase and the amplitude of the computed sine wave will reject disturbances that are not due to wheel imbalance.

The computed sine wave is compared to the sine wave that is representative of the actual wheel angle and wheel speed, and a filtered error is obtained. The error is shown in FIG. 7 at the output end of the high pass filter 112.

The sine wave is created using the values for $k_1$ and $k_2$ in a curve fitting technique. By using the computed values for $k_1$ and $k_2$, the error indicated in FIG. 7 can be minimized at the output side of high pass filter 112. That error value is fed back to the multiplier, which is connected to the output of the high pass filters at 106 and 108 in FIG. 7. As $K_1$ and $K_2$ are adjusted, the error is driven to zero at the output side of the high pass filter 112.

The integrator in the top branch of the block diagram of FIG. 7, shown at 114, implements the function of equation (24). The resulting sine wave at 110 is adjusted to match the left hand term in equation (18); i.e., $K_t M_\Delta \kappa_{if} \omega^2 \sin(\omega t + \theta_0)$.

Although embodiments of the invention have been described, it will be apparent to persons skilled in this art that modifications may be made to the invention without departing from the scope of the invention. All such modifications and equivalents thereof are covered by the following claims.

What is claimed:

1. A method for detecting dynamic imbalance of road tires for wheels of a wheeled vehicle comprising the steps of:

monitoring and measuring wheel speeds for each of the wheels;

computing an instantaneous dynamic rolling radius estimation for each wheel as a function of wheel speeds;

determining dynamic imbalance strength estimation as a function of instantaneous dynamic rolling radii;

computing dynamic imbalance strength magnitude as a function of dynamic imbalance strength estimation;

computing wheel imbalance as a function of dynamic imbalance strength magnitude for each wheel; and developing a control signal based upon the magnitude of the computed dynamic imbalance.

2. The method set forth in claim 1 wherein the step of computing rolling radii for a front wheel comprises solving a functional relationship of yaw angular rate, vehicle reference velocity, steering angle for the front wheel, half track distances from a vehicle centerline to a front wheel, front wheel speed, and distances between the center of gravity of the vehicle and the front wheels.

3. The method set forth in claim 1 wherein the step of computing an instantaneous dynamic rolling radius for a rear wheel comprises solving a functional relationship of vehicle reference velocity, yaw angular rate, half track distances from a vehicle centerline to a rear wheel, and rear wheel speed.

4. The method set forth in claim 1 wherein the step of computing the dynamic imbalance strength estimation for a wheel comprises solving a functional relationship of the mass of the wheel, wheel speed, tire damping rate in the vertical direction, tire spring rate in the vertical direction, mass distribution and tire rolling radius.

5. The method set forth in claim 1 wherein the step of computing the dynamic imbalance strength magnitude of a wheel comprises solving a functional relationship of wheel speed and filtered dynamic imbalance strength.

6. The method set forth in claim 1 wherein the step of developing a control signal comprises solving a functional relationship of wheel speed and filtered dynamic imbalance strength and developing the control signal when a threshold value for the dynamic imbalance strength is exceeded.

7. The method set forth in claim 1 wherein wheel imbalance is characterized as a sinusoidal function, the method involving computing characteristic parameters for computed magnitude and phase of a sinusoidal function representing actual imbalance of a sinusoidal function for computed imbalance and minimizing the differences in the amplitude and phase for the sinusoidal functions by changing characteristic parameters.

8. A method for detecting dynamic imbalance of road tires for wheels of a wheeled vehicle equipped with a vehicle dynamic control including at least one stability controller comprising the steps of:

monitoring and measuring wheel speeds for each of the wheels;

computing an instantaneous dynamic rolling radius estimation for each wheel as a function of wheel speeds;

determining dynamic imbalance strength estimation as a function of instantaneous dynamic rolling radii;

computing dynamic imbalance strength magnitude as a function of dynamic imbalance strength estimation;

computing wheel imbalance as a function of dynamic imbalance strength magnitude for each wheel; and developing a control signal input for the stability controller based upon the magnitude of the computed dynamic imbalance.

9. The method set forth in claim 8 wherein the step of computing rolling radii for a front wheel comprises solving a functional relationship of yaw angular rate, vehicle reference velocity, steering angle for the front wheel, half track distances from a vehicle centerline to a front wheel, front wheel speed, and distances between the center of gravity of the vehicle and the front wheels.

10. The method set forth in claim 8 wherein the step of computing an instantaneous dynamic rolling radius for a rear wheel comprises solving a functional relationship of vehicle reference velocity, yaw angular rate, half track distances from a vehicle centerline to a rear wheel, and rear wheel speed.

11. The method set forth in claim 8 wherein the step of computing the dynamic imbalance strength estimation for a wheel comprises solving a functional relationship of the mass of the wheel, wheel speed, tire damping rate in the vertical direction, tire spring rate in the vertical direction, mass distribution and tire rolling radius.

12. The method set forth in claim 8 wherein the step of computing the dynamic imbalance strength magnitude of a wheel comprises solving a functional relationship of wheel speed and filtered dynamic imbalance strength.

13. The method set forth in claim 8 wherein the step of developing a control signal comprises solving a functional relationship of wheel speed and filtered dynamic imbalance strength and developing the control signal when a threshold value for the dynamic imbalance strength is exceeded.

* * * * *